Inventor
GERHARD LINDE
RUDOLF BECKER
JÖRG REYHING

By Toulmin & Toulmin
Attorneys

United States Patent Office 3,163,511
Patented Dec. 29, 1964

3,163,511
WATER REMOVAL AND LOW TEMPERATURE SEPARATION OF HYDROCARBON MIXTURES
Gerhard Linde and Rudolf Becker, Munich-Solln, and Jörg Reyhing, Pullach, Germany, assignors to Gesellschaft für Linde's Eismaschinen Aktiengesellschaft Zweigniederlassung Hollriegelskreuth, Hollriegelskreuth, near Munich, Germany
Filed May 11, 1961, Ser. No. 109,343
Claims priority, application Germany May 12, 1960
5 Claims. (Cl. 62—18)

The present invention relates to the separation of wet hydrocarbon mixtures by rectification at low temperatures, more particularly, to an apparatus and process for separating such mixtures in conjunction with the production of pure methane, ethane and ethylene by drying the gaseous phases of the hydrocarbon mixture at a high temperature and separating the water contained in the condensate into low and high hydrocarbons.

In the production of methane, ethane and ethylene from wet hydrocarbon mixtures it has been known to initially separate a substantial portion of the water and the heavy hydrocarbons in cooling steps at temperatures ranging between 0 and —40° C. and then conducting the gas to the low temperature part of the production apparatus. Any water vapor remaining in the gas after the cooling can be readily and economically removed by adsorption agents such as gels.

The condensates resulting from the above-mentioned cooling process contain a large portion of the removed water together with the heavy and light hydrocarbons. These hydrocarbons are usually separated by a rectification so that it is possible to reobtain the constituents having a lower boiling point or to initially obtain the heavy hydrocarbons in a pure condition.

In the separation of these condensates into light and heavy hydrocarbon fractions water contained in the condensate frequently leads to the formation of ice or hydrates on the bottom portions of the rectifying column. When the condensate is at a temperature of 0° C., a portion of the water can be readily removed by taking advantage of the difference in density between the water and the hydrocarbons. Thus, the undissolved water can be removed by a conventional separator. At temperatures below 0° C. the water can be removed in the form of ice by an ice filter.

Even after this removal of the water, the condensate will still contain at least as much water corresponding to its solubility in the liquid hydrocarbon mixture. It is difficult to obtain any further drying by adsorption agents since this water is not satisfactorily adsorbed from liquids by adsorption agents and since the heavy unsaturated hydrocarbons in the condensate rapidly cause the adsorption agents to become ineffective.

It is therefore the principal object of this invention to provide a novel and improved method and apparatus for separating wet hydrocarbon mixtures at low temperatures.

It is a further object of this invention to provide a novel and improved method and apparatus for the production of methane, ethane and ethylene.

It is an additional object of this invention to provide a method and apparatus for drying a hydrocarbon mixture in the gaseous phase at high temperatures and to separate the water-containing condensates into lower and higher hydrocarbons.

The present invention essentially comprises the drying of the hydrocarbon mixture in the gaseous phase at a high temperature by the use of adsorption agents in such a manner as to avoid an impeding of the adsorbing properties by heavy unsaturated hydrocarbons and to separate the water-containing condensates into lower and higher hydrocarbons in such a manner that the formation of ice or hydrates in the rectification columns can be avoided.

The present invention is particularly adapted to the production of ethane, methane and ethylene by a separation of wet hydrocarbon mixtures at low temperatures. In this process heavy hydrocarbons are separated as a condensate from the gaseous mixture through a reflux condensation. The non-dissolved water is then eliminated from the resulting condensate. Residual lower hydrocarbons are subsequently separated from the water-saturated condensate in one or a plurality of rectification steps. Each of the rectification steps is conducted at such a temperature and pressure range as to preclude the formation of ice or hydrates from the included quantities of water in the rectification columns. The non-condensed crude gas which is a product of the reflux cooling step is then dried at a high temperature.

In this process the higher hydrocarbons and the portion of the water in the gaseous mixture are condensed in one or more precoolers which operate at temperatures ranging from 0 to about —40° C. The condensate is then conveyed to a separator wherein the nondissolved water which is still in the liquid state is separated from the condensate and removed from the system. The water-saturated hydrocarbon mixture is then passed to a rectification apparatus which may comprise one or more rectification stages wherein the hydrocarbon mixture is further separated. The temperature, at a given operational pressure of rectification, is so chosen that the water in the water-saturated hydrocarbon mixture can at no point in the rectification column lead to a water-saturated condition due to the refluxing liquid within the column and the vapors rising upwardly through the column.

The pressure of the water vapor as well as the solubility of water in liquid hydrocarbon increases considerably as the temperature increases. As a result, the percentage of moisture or liquid refluxing in the column and progressively getting warmer continues to decrease. At low or minimum total pressure the degree of saturation in water of the vapor exceeds the water-solubility of the liquid hydrocarbons at temperatures above freezing and this degree of saturation continues to increase as the temperature rises. As a result, a part of the water contained in the liquid is absorbed by the rising vapor and is carried upwardly into the cooler zones of the column. Formations of ice and hydrates occur when the water-content of the vapor exceeds the degree of saturation at the coldest point within the column which is at the head thereof. In the event the temperature at the head of the column is higher than the temperature corresponding to the condensation point of the water of the rising vapor, no water-saturated condition will occur within the column.

The product which is formed during the separation process and obtained at the head of the rectification column mainly comprises $C_2$ hydrocarbons and a portion of the $C_3$ hydrocarbons. This product is then intermixed with the gaseous mixture being passed through the precooler.

As an alternative this product can be passed through an adsorption drying stage and then further separated in a rectification column connected at the outlet side. The $C_3$ and higher hydrocarbons are collected at the sump of the rectification column and can be discharged therefrom.

After the higher hydrocarbons and the water have been separated in the precooling stage or stages the gaseous mixture substantially contains only hydrocarbons having three or less carbon atoms and minor traces of water. Since this gas no longer contains any heavy hydrocarbons which would impede the drying capacity of the adsorbent, the gas can now be dried by an adsorption process and then further processed such as by another rectification column.

It is possible that the $C_3$ hydrocarbons which are separated in a subsequent rectification stage can be conveyed in the liquid state into the lower portion of the first rectification column. This will serve to lower the boiling point of the sump liquid in the first rectification column and undesired polymerizations are thereby substantially avoided.

Other objects and advantages of this invention will be apparent upon reference to the accompanying description when taken in conjunction with the following drawings, wherein FIGURE 1 is a schematic view of an installation for treating a wet hydrocarbon mixture in accordance with the present invention;

Returning now to the drawings, wherein like reference symbols indicate the same parts throughout the various views, a specific embodiment and several modifications of the apparatus for carrying out this invention will be described with a description of the process of this invention.

Figure 1:
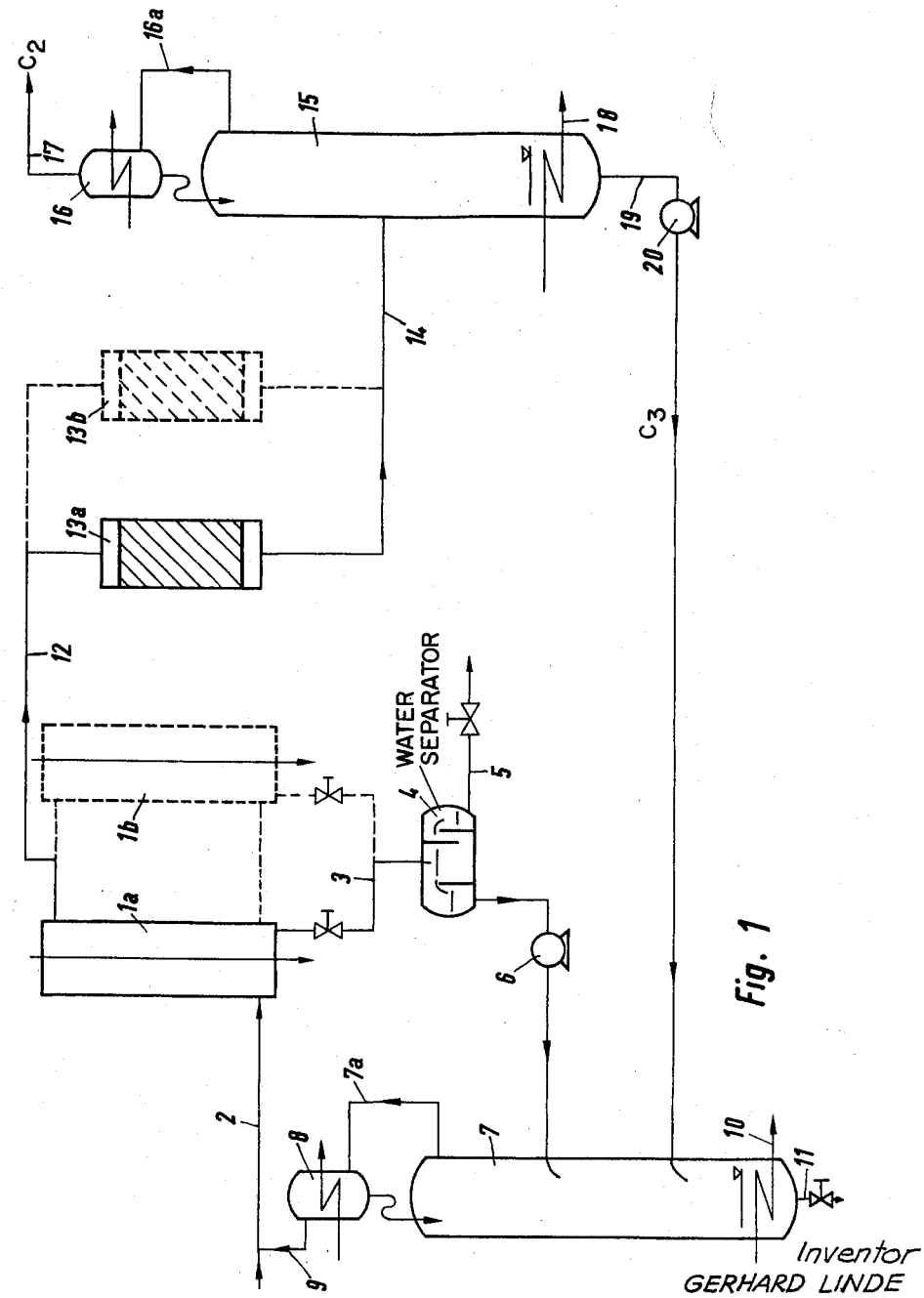

In FIGURE 1 there is shown a pair of precoolers $1a$ and $1b$ which may be alternatingly connected in the installation. A supply line 2 is connected to the precooler through which is introduced the gaseous mixture. The condensate line 3 leads from the sump of the precooler $1a$ to a separator 4 from which undissolved water is separated from the condensate and removed from the installation through a discharge line 5. The separator is then connected through a pump 6 to a rectification column 7. A line $7a$ connects the head of the column 7 with a water-cooled condenser 8 which, in turn, is connected through a line 9 to the gas supply line 2.

There is a heating unit 10 mounted in the bottom portion of the column 7. Residual liquid is discharged from the sump of the column 7 through a discharge line 11.

A line 12 extends from the upper portion of the precooler $1a$ to convey non-condensed crude gas therefrom. The line 12 leads to an adsorptive dryer $13a$ which is filled with a suitable adsorbent such as silica gel. An identical dryer $13b$ is provided so as to be alternatingly in operation with the dryer $13a$.

The dryer $13a$ is then connected through a line 14 with a $C_2/C_3$ rectification column 15. A line $16a$ connects the head of the column 15 with a water-cooled condenser 16 through which the head product is discharged through a conduit 17.

The sump of the column 15 is heated by a heater 18 to a temperature of about 340° K. A conduit 19 extends from the sump of the column 15 to a pump 20 whose outlet is connected to the rectification column 7.

To initiate the process of this invention, using the apparatus as illustrated in FIGURE 1, a gaseous mixture is introduced through the supply line 2 into the precooler $1a$. This gaseous mixture contains approximately 35% of $CH_4$, 35% of $C_2$ hydrocarbons, 20% of $C_3$ hydrocarbons, certain percentages of $C_4$ and higher hydrocarbons and some amounts of hydrogen and nitrogen.

The gaseous mixture is at a pressure of approximately 30 atmospheres and at room temperature. The precooler $1a$ is alternatively operated with the precooler $1b$. In the precooler $1b$ the gas can be precooled to a temperature of about 270° K. by means of cold products emerging from the low temperature parts of the gas separating installation.

Approximately 16 to 20% of the quantity of incoming gaseous mixture is then obtained as a condensate which contains the greatest portion of the $C_4$ and higher hydrocarbons and about half of the $C_3$ hydrocarbons which were originally in the gaseous mixture. The condensate also contains smaller quantities of $C_2H_6$, $C_2H_4$ and $CH_4$. In addition, this condensate contains the greatest portion of the water which is condensed during the cooling of the circulating gaseous mixture.

This condensate is then passed through conduit 3 into the separator 4 from which the water is separated and removed in a known manner.

The water-saturated hydrocarbon mixture is then supplied to the rectification column 7 through the pump 6. All of the $CH_4$, $C_2H_4$ and $C_2H_6$ products contained in the condensate are rejected from the head of the column 7. The column 7 is operated at such temperatures that no hydrates are formed therein and at which the product emerging from the head of the column is free from $C_4$ and higher hydrocarbons. Normally, the temperature existing in the head of this column should not be inferior to +10° C., whereas the temperature of sump liquid should be of from +70° C. to +80° C., or somewhat higher, depending on the composition of this liquid. The head product emerging from the column 7 still contains a large percentage of $C_3$ hydrocarbons. Accordingly, this head product is then remixed with the incoming gaseous mixture in the supply line 2 after the head product has passed through the water-cooled condenser 8.

The sump product in the column 7 is heated by the heater 10 to a temperature of approximately 345° K. The $C_4$ and higher hydrocarbons and the residual portion of the $C_3$ hydrocarbons are then discharged through the conduit 11.

The non-condensed portion of the crude gas emerges from the precooler $1a$ through the conduit 12. This portion is practically free from $C_4$ and higher hydrocarbons. Accordingly, this gas can be dried at high temperature in either of the two exchangeable dryers $13a$ or $13b$.

The dried gas is then conveyed into the $C_2/C_3$ column 15. A head product which is practically free from $C_2$ emerges from the column 15 through the line $16a$ and passes through a cooler 16 to be subsequently conveyed to an ammonia refrigerating machine through the conduit 17.

A sump of the column is heated by the heater 18 to a temperature of about 340° K. The sump product of the column 15 contains primarily $C_3$ and eventually a minor portion of $C_4$ hydrocarbons. This sump product is drawn off through the conduit 19 and reintroduced into the column 7 through the pump 20.

In the treatment of a gas having a low content of $C_2$ hydrocarbons and a higher content of inert components it may not be possible to condense the heavy components in a single precooling stage so that an effective adsorptive drying of the precooled gases is possible. In this treatment a second cooling stage is connected to the outlet of the described precooling stage. The gas is further cooled in the second cooling stage prior to being dried by adsorption.

Figure 2:
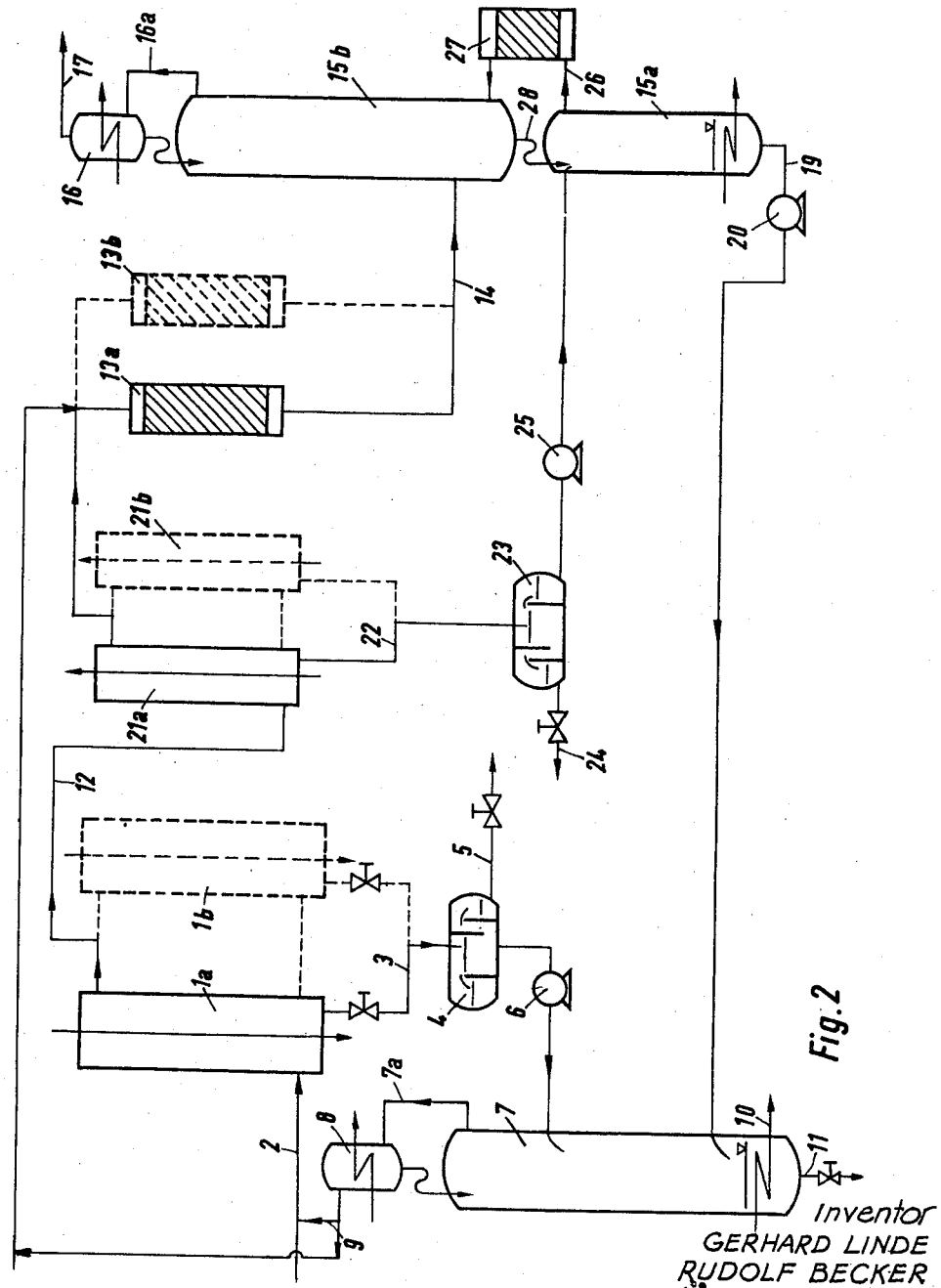
FIGURE 2 is a schematic view of a modification of this installation wherein a plurality of cooling stages is employed together with a double rectifying column.

Proceeding next to FIGURE 2 there is shown an installation for the treatment of a crude gas which contains about 20% of $C_3$ and higher hydrocarbons with, however, only 30% of $CH_4$ and $C_2$ hydrocarbons but with a larger proportion of inert gases. It may not be possible to condense the heavy components in a gas of this composition in a precooling stage to such a degree that an effective drying of the precooled gas by adsorption is possible.

The arrangement illustrated in FIGURE 2 is similar to the apparatus of FIGURE 1 but contains several additional components. Two reflux coolers $21a$ and $21b$ are connected into the line 12 after the precoolers $1a$ and $1b$ and prior to the dryers $13a$ and $13b$. A conduit 22 leads from the sumps of the coolers $21a$ and $21b$ to a separator 23. A discharge line 24 extends from the separator 23 to discharge water which is separated from the condensate. A pump 25 connects the separator 23 to a lower column 15a which, together with the upper column 15b, forms the $C_2/C_3$ rectifying column.

A line 26 leads from the top of the lower column 15a to a dryer 27 which is connected to the lower portion of the column 15b. The sump of the column 15b is connected by a conduit 28 to the head of the column 15a.

In addition, FIGURE 2 depicts an alternative recycle for the overhead from column 7. Instead of being combined with the incoming feed, the contents in line 9 may avoid the cooler and be combined with the non-condensed gaseous portion.

In the operation of the installation of FIGURE 2 the crude gas mixture which has been precooled to a temperature of about 283° K. in the precooler 1a is further cooled in the reflux cooler 21a to a temperature of about 258° K. A suitable coolant, such as ammonia, may be used with the reflux cooler 21b.

The condensate formed in the cooler 21a contains practically all of the $C_4$ and higher hydrocarbons. This condensate is drawn off through the conduit 22 through which it is conveyed to the separator 23. Since at this point the temperature of the condensate is still greater than the freezing point of the condensate, the water in the liquid form can be separated in a conventional manner and removed through the discharge line 24.

The remainder of the condensate which is now water-saturated is pumped through the pump 25 into the lower column 15a. This column is so operated that in spite of the residual quantities of water in the condensate no ice or hydrates are formed and accumulate within the column. As a result, the gases emerging from the head of the column 15a through the conduit 26 are virtualy free from $C_4$ hydrocarbons. These gases are freed from water vapors in a dryer 27 and are then introduced into the column 15b. The column 15b performs a function of the upper column of a double rectifying column which is to scavenge the $C_3$ hydrocarbons.

The gases emerging from the second cooling stage 21a are dried in the dryer 13a and are then conveyed through the conduit 14 to be introduced into the column 15b.

The product emerging from the head of the column 15b is virtually free from $C_3$ hydrocarbons and this product is conducted to the low temperature section through the line 17 for further separation.

The sump liquid accumulating in the column 15b is supplied through the conduit 28 to the head of the column 15a wherein it serves as a washing liquid. The sump product of the column 15a is virtually free from $C_2$ hydrocarbons and is removed through the conduit 19 to be reintroduced into the column 7 through the pump 20.

In those situations where the crude gas has a relatively high content of $C_2$ hydrocarbons and $CH_4$ and contains relatively few $C_3$ and higher hydrocarbons as well as inert components, the condensation point of the crude gas may be so low at a pressure of about 30 atmospheres that practically no condensate is obtained in the precooler. However, it is also possible that with a subsequent cooler all of the higher hydrocarbons including $C_3$ hydrocarbons are condensed so that it is not necessary to insert a $C_2/C_3$ column in the main gaseous stream. However, this condensate would also contain a large portion of $C_2$ hydrocarbons and $CH_4$ and its boiling point will be below the freezing point. The water in this condensate will precipitate in the form of ice crystals which must be removed by interchangeable ice filters. The filtered mixture can then be supplied to the lower portion of the $C_2/C_3$ column and the rectification can then be carried out in a temperature range in which no water-saturation can occur and the gaseous product emerging from the head of the column is passed through a dryer to remove the water vapors therefrom prior to entering the subsequent column.

Figure 3:
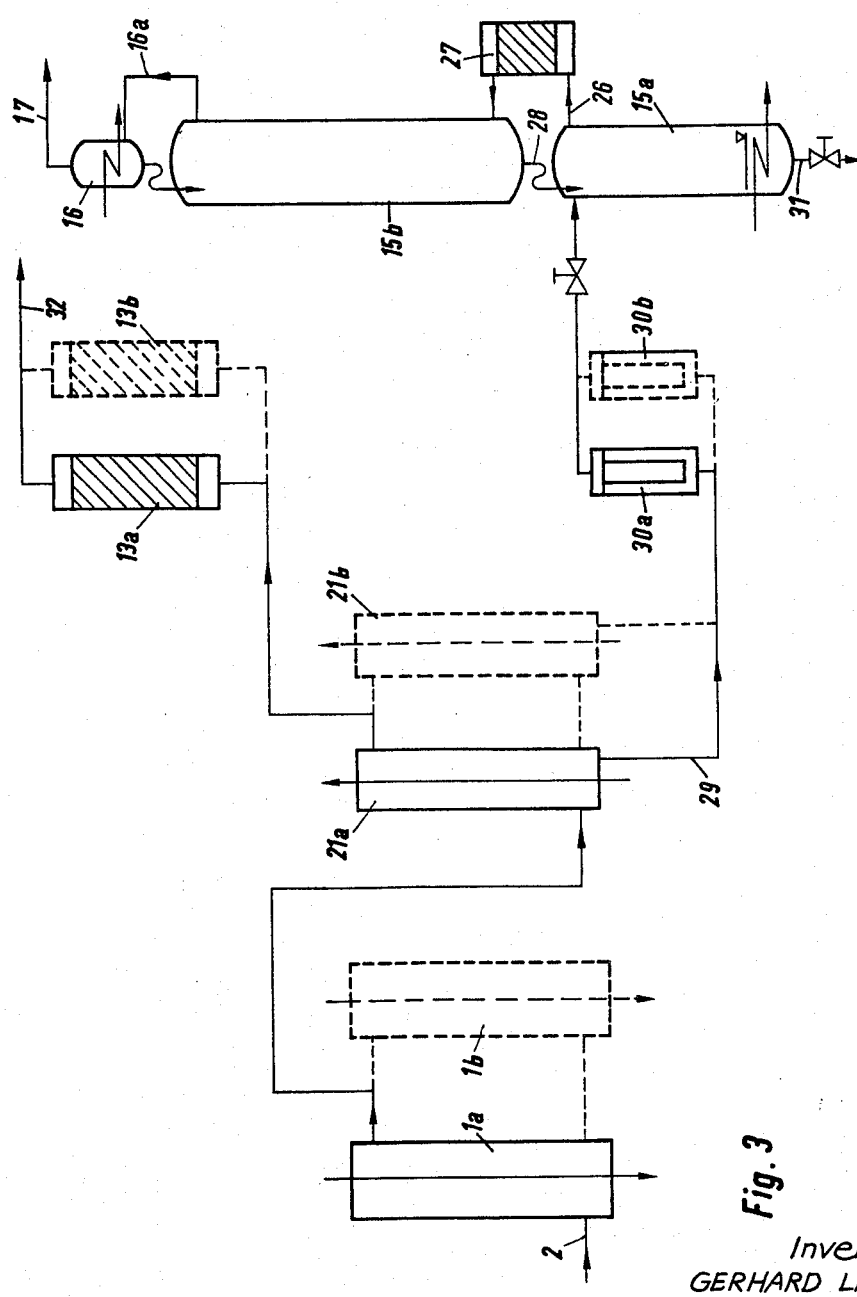
FIGURE 3 is a schematic view of another modification of this installation showing the use of ice filters for separating water in the form of ice from the condensate obtained from the precooling stage.

In FIGURE 3 there is shown an installation for the separation of a crude gas which comprises about 6% $C_3$ hydrocarbons but has high contents of $C_2H_6$, $C_2H_4$ as well as $CH_4$. This gas has approximately the subsequent composition:

|  | Percent |
|---|---|
| Inert gases | 11 |
| $CH_4$ | 36 |
| $C_2H_4$ | 30 |
| $C_2H_6$ | 15 |
| $C_3$ hydrocarbons | 6 |
| $C_4$ and higher hydrocarbons | 2 |

In the apparatus of FIGURE 3 a line 29 connects the sump of the reflux cooler 21a with ice filters 30a and 30b. These ice filters are of the exchangeable type which can be periodically removed and replaced. The ice filters are then connected to the upper part of the column 15a. The sump liquid of the column 15a is discharged through the line 31.

The non-condensed crude gas mixture which emerges from the cooler 21a passes through the dryer 13a from which it is conveyed through a conduit 32 directly to the low-temperature arrangement of the gas separating installation.

The condensation point of the crude gas mixture entering the installation through the supply line 2 can now be so low that, at a pressure of 30 atmospheres, virtually no condensate is obtained in the precoolers 1a or 1b, whichever is being used at that time. However, all of the $C_3$ and higher hydrocarbons can be condensed in the reflux cooler 21a when being cooled at a temperature of about 228° K. Thus, it is unnecessary to place a $C_2/C_3$ column into the main gas stream. The condensate will still contain, however, large quantities of $C_2H_6$ and $C_2H_4$ as well as a high portion of $CH_4$ in addition to the $C_3$ and $C_4$ hydrocarbons. The boiling point of this condensate emerging from the cooler 21a is lower than the freezing point of the water. Accordingly, the excessive water in the liquid is removed in the form of ice crystals and hydrates in the ice filter 30a. The condensate is then introduced into the lower column 15a.

The rectification is now conducted in a temperature range wherein no water saturation can occur and the emerging head product of the column 15a is conducted through the line 26 into the dryer 27 prior to being introduced into the column 15b.

A liquid mixture of $C_3$ and higher hydrocarbons is tapped from the sump of the column 15a through the discharge conduit 31.

The non-condensed gaseous portions emerging from the cooler 21a and dried in the dryer 13a contain only $C_2$ hydrocarbons, $CH_4$ and inert gases. These dried gases are then conducted through the line 32 directly to the low temperature side of the gas separating installation.

Thus it can be seen that the present invention provides an effective process and apparatus for the separation of wet hydrocarbon mixtures by means of a rectification at low temperature. With slight modifications to the apparatus and process crude gases of various compositions may readily be separated by this rectification.

It will be understood that this invention is susceptible to further modification and, accordingly, it is desired to comprehend such modifications within this invention as may fall within the scope of the appended claims.

What is claimed as this invention is:

1. A process for separating water-containing hydrocarbon mixtures, which process comprises the steps of:
   (1) cooling a crude gaseous water-containing hydrocarbon mixture in at least one preliminary cooling stage, and a final cooling stage, to obtain condensates containing hydrocarbons and undissolved water, and additionally a non-condensed portion of said gaseous mixture;
   (2) separating the undissolved water from said condensates;
   (3) rectifying the resultant condensate from the preliminary cooling stage in a first distillation zone under such temperature-pressure conditions that an overhead product of lower hydrocarbons and water is produced, said water being present in a concentration lower than the saturation concentration at the coldest point of the distillation zone, thereby preventing the formation of ice and hydrates within the column, and also that a bottoms product of $C_3-$ and higher hydrocarbons is produced;

(4) recycling the overhead product from step (3) to the crude gas mixture;

(5) rectifying the condensate from the final cooling stage, and freed of any undissolved water, in the lower column of a double-fractionating column to produce a bottoms product of $C_3-$ and higher hydrocarbons and an overhead product containing water and lower hydrocarbons, said column being operated under such pressure-temperature conditions as to maintain the concentration of water below the saturation point at the coldest part of the column, thereby avoiding any formation of ice and hydrates within said column;

(6) passing the bottoms product from step (5) to the first distillation zone wherein it is further rectified according to step (3)

(7) passing the overhead product from step (5) through an adsorbent-type dryer, thereby removing water;

(8) passing the resultant dried overhead vapor into the upper column of said double rectifying column;

(9) passing the non-condensed portion of said gaseous mixture (step (1)) through an adsorbent-type dryer, thereby removing water;

(10) passing the resultant dried non-condensed portion of said gaseous mixture into the upper column of said double-fractionating column; and

(11) rectifying both the dried overhead vapor and the dried non-condensed portion of the initial gaseous mixture in said upper column to produce a dry overhead fraction of $C_{1-2}$ hydrocarbons, and a bottoms fraction which is passed to the top of the lower column and utilized as reflux liquid therefor.

2. A process for separating water-containing hydrocarbon mixtures, which process comprises the steps of:

(1) cooling a crude gaseous water-containing hydrocarbon mixture in at least one preliminary cooling stage, and a final cooling stage, to obtain condensates containing hydrocarbons and undissolved water, and additionally a non-condensed portion of said gaseous mixture;

(2) separating the undissolved water from said condensates;

(3) rectifying the resultant condensate from the preliminary cooling stage in a first distillation zone under such temperature-pressure conditions that an overhead product of lower hydrocarbon and water is produced, said water being present in a concentration lower than the saturation concentration at the coldest point of the distillation zone, thereby preventing the formation of ice and hydrates within the column, and also that a bottoms product of $C_3-$ and higher hydrocarbons is produced;

(4) combining the overhead product from step (3) with the non-condensed portion of said gaseous mixture;

(5) rectifying the condensate from the final cooling stage, and freed of any undissolved water, in the lower column of a double-fractionating column to produce a bottoms product of $C_3-$ and higher hydrocarbons and an overhead product containing water and lower hydrocarbons, said column being operated under such pressure-temperature conditions as to maintain the concentration of water below the saturation point at the coldest part of the column, thereby avoiding any formation of ice and hydrates within said column;

(6) passing the bottoms product from step (5) to the first distillation zone wherein it is further rectified acording to step (3);

(7) passing the overhead product from step (5) through an adsorbent-type dryer, thereby removing water;

(8) passing the resultant dried overhead vapor into the upper column of said double rectifying column;

(9) passing the combined streams from step (4) through an adsorbent-type dryer, thereby removing water;

(10) passing the resultant combined dried streams into the upper column of said double-fractionating column;

(11) rectifying both the dried overhead vapor and the dried combined streams in said upper column to produce a dry overhead fraction of $C_{1-2}$ hydrocarbons, and a bottoms fraction which is passed to the top of the lower column and utilized as reflux liquid therefor.

3. A process for separating a water-containing gaseous crude hydrocarbon mixture having a high concentration of $C_{1-2}$ hydrocarbons and a low concentration of $C_3$ and higher hydrocarbons, which process comprises the steps of:

(1) cooling said crude gaseous hydrocarbon mixture in a plurality of stages, the final stage being below the freezing temperature of water, thereby producing a condensate containing undissolved water in the form of ice, and additionally a non-condensed portion of said crude gaseous hydrocarbon mixture;

(2) drying said non-condensed portion of said crude gaseous hydrocarbon mixture in an adsorbent-type dryer;

(3) filtering the ice from said condensate of step (1);

(4) rectifying the ice-free condensate in the lower column of a double-fractionating column to produce a bottoms product of $C_3-$ and higher hydrocarbons and an overhead product containing water and lower hydrocarbons, said column being operated under such pressure-temperature conditions as to maintain the concentration of water below the saturation point at the coldest part of the column, thereby avoiding any formation of ice and hydrates within said column;

(5) passing the overhead product from step (4) through an adsorbent-type dryer, thereby removing water;

(6) passing the resultant dried overhead vapor into the upper column of said double-fractionating column, and rectifying said vapor to produce a dry overhead fraction of $C_{1-2}$ hydrocarbons, and a bottoms fraction which is passed to the top of the lower column, as reflux liquid.

4. In an apparatus for separating wet hydrocarbon mixtures at low temperatures in the production of ethylene, ethane and methane, the combination of at least one first reflux cooler, and at least one final reflux cooler, said coolers connected in series having a supply line for a gaseous mixture connected to the first of them, a first separator for removing water connected to the first reflux cooler and a second separator for removing water connected to the final reflux cooler, a first rectifying column, said first separator being connected with the central portion of said rectifying column, a condenser connected between the top of said rectifying column and said supply line, a double rectifying column comprising an upper and a lower column, conduit means connecting the bottom of said upper column with the top of said lower column, said second separator being connected with the head of said lower column, a first dryer connected between said upper and lower columns for the passage of gaseous products from said lower column to said upper column, a second dryer connected between the final of said reflux coolers and said upper column so as to convey dried gases from said cooler to said double rectifying column, the sump of said lower column being connected to said first rectifying column.

5. In an apparatus for separating wet hydrocarbon mixtures at low temperature in the production of ethylene, ethane and methane, the combination of reflux coolers having a supply line for a gaseous mixture connected thereto, an ice filter connected to said reflux coolers for removing water in the form of ice, when the temperature of the condensate is below the freezing point of water, a double rectifying column comprising an upper and a lower column, conduit means connecting the bottom of sadi upper column with the top of said lower column, said ice filter being connected with the head of said lower column, a first dryer connected between said upper and lower columns for the passage of gaseous products from said lower column to said upper column, a second dryer connected with said reflux coolers, conduit means for withdrawing $C_3-$ and higher hydrocarbons from the sump of said lower column and to feed the residual gas mixture including $C_2-$ and lower hydrocarbons from said second dryer and from the top of said upper column to further separation at low temperature.

References Cited in the file of this patent
UNITED STATES PATENTS

| | | |
|---|---|---|
| 2,067,349 | Schuftan | Jan. 12, 1937 |
| 2,258,015 | Keith et al. | Oct. 7, 1941 |
| 2,274,094 | Rupp | Feb. 24, 1942 |
| 2,475,957 | Gilmore | July 12, 1949 |
| 2,498,806 | Hachmuth | Feb. 28, 1950 |
| 2,777,299 | Skaperdas | Jan. 15, 1957 |
| 2,953,905 | Chrones et al. | Sept. 27, 1960 |